United States Patent [19]
Jonsson

[11] Patent Number: 6,115,613
[45] Date of Patent: Sep. 5, 2000

[54] SYSTEM AND METHOD FOR PROVIDING TELEPHONE SERVICE TO EACH MEMBER OF A GROUP OF RADIO TELEPHONE SUBSCRIBERS

[75] Inventor: Björn Jonsson, Järfälla, Sweden

[73] Assignee: Telefonaktiebolaget L M Ericsson, Stockholm, Sweden

[21] Appl. No.: 08/887,400

[22] Filed: Jul. 2, 1997

[51] Int. Cl.[7] .............................. H04M 3/54; H04B 1/06
[52] U.S. Cl. ......................... 455/519; 455/515; 455/414
[58] Field of Search ................................. 455/414–417, 455/433, 551–553, 518, 459; 379/114, 144

[56] References Cited

U.S. PATENT DOCUMENTS

| | | |
|---|---|---|
| 4,991,198 | 2/1991 | Tate et al. . |
| 5,103,448 | 4/1992 | Barnes et al. . |
| 5,255,308 | 10/1993 | Hashimoto et al. . |
| 5,345,500 | 9/1994 | Breeden et al. . |
| 5,359,642 | 10/1994 | Castro . |
| 5,363,426 | 11/1994 | Nyhart . |
| 5,392,346 | 2/1995 | Hassler et al. . |
| 5,425,083 | 6/1995 | Furuya et al. . |
| 5,426,690 | 6/1995 | Hikuma et al. . |
| 5,473,605 | 12/1995 | Grube et al. . |
| 5,475,689 | 12/1995 | Kay et al. . |
| 5,530,945 | 6/1996 | Chavez, Jr. et al. . |
| 5,559,859 | 9/1996 | Dai et al. ................................. 455/459 |
| 5,592,541 | 1/1997 | Fleischer, III et al. . |
| 5,758,291 | 5/1998 | Grube et al. ............................. 455/518 |
| 5,778,320 | 7/1998 | Drozt et al. .............................. 455/518 |
| 5,835,860 | 11/1998 | Diachina .................................. 455/519 |
| 5,878,338 | 3/1999 | Alperovich et al. .................... 379/211 |

FOREIGN PATENT DOCUMENTS

WO 93/03585  2/1993  WIPO .
WO 94/29992  12/1994  WIPO .

OTHER PUBLICATIONS

PCT Standard Search Report, Nov. 18, 1998, PCT/SE98/01270.

Rydin, et al.: "Network and Service Evolution in Fixed and Mobile Networks"; Oct. 25, 1992; ISS'9 2, Oct. 1992, vol. 1; pp. 53–58.

Patent Abstracts of Japan, vol. 096, N. 003, Mar. 29, 1996; Publication No. 07303280.

*Primary Examiner*—Emanuel Todd Voeltz
*Assistant Examiner*—M. David Sofocleous
*Attorney, Agent, or Firm*—Jenkens & Gilchrist, P.C.

[57] ABSTRACT

Mobile radio telephone service is provided to a plurality of members of a subscriber group. Members of the subscriber group, which may comprise, for example, members of a family or employees of a small business, share a single subscription to the mobile radio telephone network which subscription limits the number of traffic channels which can be simultaneously occupied by the members. The group subscription avoids each of the individual members having to have a separate mobile radio system subscription and at the same time allows the network operator to spread subscriber traffic over a larger period of time during the day.

30 Claims, 3 Drawing Sheets

SYSTEM AND METHOD FOR PROVIDING TELEPHONE SERVICE TO EACH MEMBER OF A GROUP OF RADIO TELEPHONE SUBSCRIBERS

BACKGROUND OF THE INVENTION

1. Field of the Invention

The invention relates to radio telecommunications systems, and more particularly, to a method and system for enabling a plurality of mobile telephone users to share a common subscription which includes certain limitations on the services available to the members of the mobile telephone user group sharing that subscription.

2. Description of the Related Art

In recent years the growth of mobile radio telephone systems, particularly cellular radio telephone systems, has been phenomenal. Such systems enable complete telecommunications facilities to be furnished to a community, a city, or even an entire country without the time and expense of installing a wire line infrastructure. Moreover, mobile radio telephone systems enable the availability of communications resources to a subscriber regardless of the physical position of the subscriber within the system or whether the subscriber is moving or stationary.

Each mobile radio telecommunication system operator must make a very large investment in infrastructure equipment, including mobile switching centers and base stations, in order to serve the geographic territory for which it has a license. Thus, in order to maximize its revenue and return on this investment, an operator desires to utilize as much of the available radio frequency spectrum within its area as possible by maximizing the subscribers who use the system. It is in the best interest of both mobile radio telephone system operators and their subscribers to increase the number of mobile telephones in use within the system. However, since there is a separate charge for each subscription enabling access to the system, certain classes of subscribers, such as family units and small companies, hesitate to incur the expense of a separate mobile phone subscription for each person in that unit. From the system operators' view point, an increase in the number of subscriber stations having potentially simultaneous access to the system increases the demand for radio traffic channels within the system and contributes to a major problem in expanding the capacity of mobile radio telephone systems and networks. For this reason, it would be a major advantage to allow a single subscription to be shared by several individuals within a user group thus enabling a lower communication cost per user than a single subscription for each of the users in that group.

Certain cellular radio system operators have attempted to solve this problem. One such system, for example, offers a subscriber service which includes a single subscriber number but two subscriber information module (SIM) cards each usable separately in different mobile telephone stations. Each card may be inserted into a separate mobile telephone terminal and used independently of one another for outgoing calls. An incoming call directed to the common subscriber number is completed to the terminal which was used last and an incoming call which is not answered by the terminal to which it is directed is automatically rerouted to the other terminal. This service is particularly adapted to separate a business usage of the subscription from a private usage thereof in that each of the two terminals is charged independently of the other. While it would be possible for two persons to share a single subscription under this service, it would have certain limitations and disadvantages.

Similarly, certain international telecommunications standardization bodies, for example, the International Telecommunications Union, have specified integrated services digital network (ISDN) services which include multiple subscriber numbers that provide the possibility of assigning multiple ISDN numbers to a single interface in a fixed ISDN network. For example, U.S. Pat. No. 5,392,346 describes a system which includes this feature. However, this system is limited to fixed wireline ISDN networks because of its unique features and architecture.

In addition, U.S. patent application Ser. No. 08/585,149, filed Jan. 10, 1996 in the name of Carlsson et al., entitled "Cellular Telecommunications Systems Having Selectively Associatable Usage Parameters" and assigned to the assignee of the present application describes a system for registering several users on a single subscription. In the system of the Carlsson et al. application all of the registered users are allowed to seize a traffic channel simultaneously which, from the system operator's point of view is somewhat of a disadvantage in that it increases the traffic on the network without the revenue of multiple subscriptions. The system operator would much rather encourage separate subscriptions for which a subscription fee is received for each potential access. Another disadvantage of the Carlsson et al. system is that all of the users on a common subscription are governed by the same conditions associated with that subscription. In the case of a family unit having a single subscription it would be more desirable to have individual conditions associated with each individual member of the family having possible access to the network.

A disadvantage of the prior art systems is that in order to secure a broad usage of mobile telephones among certain groups of users such as families and small businesses, such usage is inhibited by the necessity of each user having to sign an individual subscription agreement with an operator and incur substantial initial and periodic costs in association with that subscription. In addition, from the system operator's point of view, the number of available traffic channels is a critical resource of the system and the operator has a substantial interest in spreading system traffic across time in order to maximize the utilization of these resources.

The present system addresses these problems and solves them with other advantages which will be clear from the following description of the invention.

BRIEF SUMMARY OF THE INVENTION

In one aspect the present invention includes providing a group subscriber telephone service in a mobile radio telephone system in which the subscriber group has a system identity and each of the separate members of the group each have separate system identities. Access to the system by individual members of the group include restrictions which are a function of the nature of the group subscription parameters determined by the system operator selected by the group. For example, members of the group may be restricted to a discrete number (one or more) of communication channels.

In another aspect the present invention includes for providing mobile radio telephone group subscriptions in which each member of a mobile radio telephone subscription group is provided with a subscriber station having both a group subscription identity and a group member identity. A group subscription service node is accessible from both the radio telecommunications network and the fixed telephone network and includes logic selectively controlling the incoming and outgoing connections to each member of each of the subscription groups operating within the radio telecommunications network, the group subscription service node handles both incoming and originating call attempts associated with members of a subscription group are received and selectively completed between third parties and members of the subscription group in accordance with a service profile comprising an individual profile associated with each of the members of the group and a group service profile associated with the group as a whole.

In a still further aspect of the present invention telephone service within a radio telephone system is provided to a group of radio telephone subscribers which has a group identity and each member of which group has a separate individual identity within the system. A call attempt is received by a member of the subscriber group at the system and the identity of the subscriber group and the member thereof placing the call attempt is determined. Stored records of the subscriber group and member of the group making the call attempt are retrieved from memory and the call attempt is parked within the system. The call is completed from the system to the called party but not connected to the parked call attempt by the member of the group until it is determined within the system whether or not the call should be connected based upon criteria stored within the system. Finally, the parked call attempt by the group member and the completed call from the system to the called party are either connected or terminated.

In yet another aspect of the invention group radio telephone service within a radio telephone system to the members of a subscriber group which have both a group identity and an individual identity for each of the members of the group. In this aspect of the invention incoming calls are completed by receiving a call at the system directed to either the group or a specific member thereof, the subscriber group and member thereof are identified and the records of the subscriber group and its members are retrieved from memory within the system. The incoming call is parked at the system and it is determined whether the call is directed to the entire group or a specific member of that group. The call is completed to one of the members of the group following the determination.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION OF THE PREFERRED EMBODIMENT

The method and system of the present invention allows a mobile telephone network to provide a subscription service which emulates the type of service available in the fixed telephone network. That is, a mobile telephone system subscription is provided with a single group subscription for which a single fee is paid to the operator, but wherein each member of the group has access to private mobile telephone service. Such service is particularly adapted for family units as well as small companies each of which may comprise a group having a plurality of members. In such a group each family member obtains full flexibility in using the mobile telephone network with only a limited amount of risk of congestion under the circumstances that more than one member of the group tries to simultaneously make a mobile telephone call.

The operator of the mobile telephone network within which the subscription service of the present invention is implemented, obtains an improved spread of the mobile radio traffic generated over time due to the fact that each subscription group can only generate preselected maximum traffic, for example, one Erlang. On the other hand, the method and system of the present invention promotes a higher volume of mobile telephones in active use, since each member of the group has a private mobile telephone station, resulting in higher total traffic within the network and increased revenue to the operator. The subscription service of the present invention also enables the incorporation of fixed telephone advantages into the mobile network and thus encourages the replacement of fixed phones with mobile phones.

The service logic required to implement the method and system of the present invention, described in more detail below, can be administered either by the network operator or by an independent vendor which provides a subpendent vendor which provide to the operator under contractual service tariffs.

The method and system of the present invention provides for a subscription group within which each member of that group, for example, a family or a small business, has a private mobile telephone having its own identity in a mobile telephone network. However, the system limits the number of traffic channels which can be used simultaneously by the members of the group for either outgoing or incoming calls to a predetermined number of channels.

Figure 1:
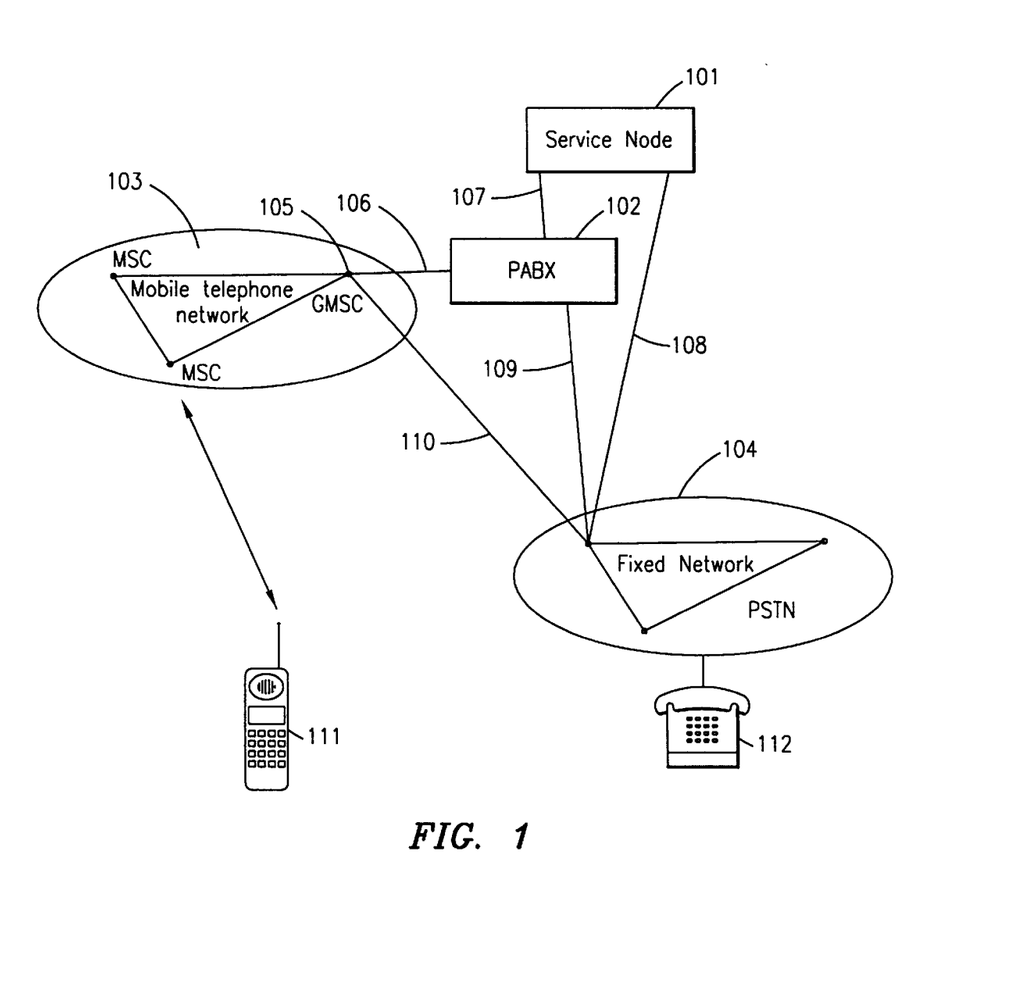
FIG. 1 is block diagram illustrating the system of the present invention.

Referring to FIG. 1, one aspect of the system of the present invention includes a service node 101 which contains a switching and data processing system which is connected to a switch such as a private automatic branch exchange (PABX) 102 by means of a communication connection 107. The switching and data processing system comprising the service node 101 may, for example, be implemented in the form of a PABX and accessed over a standard computer telephony integration (CTI) interface. The PABX 102 is in turn connected to the fixed telecommunication network PSTN 104 by a connection 109 while the service node 101 is connected to the PSTN 104 by means of connection 108. A mobile telecommunications network 103, comprises a plurality of mobile switching centers (MSCS) base stations (not shown) and subscriber stations 111. The mobile telephone network 103 is connected through a gateway mobile switching center (GMSC) 105 to the PABX 102 by means of a data link 106 and to the PSTN 104 by means of a data link 110. Fixed wire line subscribers 112 are connected to the PSTN 104 in conventional fashion.

The system of the invention includes service access control logic, which may be embodied in either the mobile telephone network 103 or in the mobile subscriber terminal 111, which performs the function of routing outgoing calls made by a member of a subscription group to the service node 101. The service node contains application software for processing the outgoing call made by a member of a subscriber group in accordance with the system of the present invention.

No outgoing call can be made from the mobile terminal of any of the individual members of the subscription group other than to or through the service node 101. This control function can be integrated with the functionality of the mobile terminals of the group members or implemented as a network function within the system of the present invention.

An outgoing call made from the mobile subscriber station of a first user 111, who is a member of a subscription group, to a party 112 connected to the fixed PSTN network 104 is routed through the mobile telephone network 103 to GMSC 105, the communication link 110 to the fixed PSTN 104 and from there over link 109 to the PABX 102, link 107 to the service node 101. Alternatively, a call attempt from the subscriber group mobile station 111 may be routed from the GMSC 105 through communication link 106, the PBAX 102, the communication link 107 to the service node 101. When the group member 111 places a call attempt, the identity of the called party 112, i.e., the B-number dialed by the mobile subscriber 111, is transferred to the service node 101 via the communication links. The service node next parks the call from the mobile subscriber group user 111 and places a second call directly from the service node 101 to the called party 112 via the communication link 108 connected to the fixed PSTN 104. If this call from the service node 101 is answered by the called party 112, and various system programmable service criteria are satisfied as further described below the logic and switching elements within the service node 101 connect the mobile group subscription user 111 to the fixed called party 112 to complete the call.

The service node 101 includes program logic which enables the detection of simultaneous call attempts from more than one member of the same subscription group. If such simultaneous call attempts occur, the service node logic can be selectively programmed to resolve congestion from a plurality of members of the same subscription group in accordance with various options further set forth below. In addition, the service node 101 includes means for compiling charging information on members of each subscription group including information which enables the calculation of usage time and cost information on individual members of the group as well as the total usage time and cost for all members of the same subscription group. The service node 101 functions to provide customized management of incoming and outgoing calls for each of the members of each of the subscription groups.

The service node 101 includes a number of preselectable modes of operation in order to deal with the issue of potential congestion between various members of a subscription group. For example, in the event a member of a subscription group attempting to place a call into the system encounters congestion due to one or more members of the same group currently occupying the system facilities, the service node can resolve the potential congestion by requesting the group member attempting the call to enter an access code. Entry of the authorized access code enables completion of the call attempt of the user by overriding the restriction normally imposed upon the group subscription by the service node logic, however, at a higher tariff than would normally be imposed upon the call. Of course, the service logic may also selectively allow a preselected number of simultaneous calls, either incoming or outgoing for each subscription group. In addition, the service node 101 may be rendered responsive to quality of service information, such as call setup time, and allow various offered services dependent upon the nature of this information. For example, the members of a single subscription group could be allowed more simultaneous traffic channels at the same charging tariff rate during periods of low traffic within the network than during peak traffic hours of the network. Additionally, the service logic 101 can provide priority parameters specifically defined for each subscription group whereby the service node 101 detects the priority level assigned to the particular member of a subscription group making a call attempt and determines whether or not that priority is higher than a member of the subscription group currently using a single traffic channel associated with the group subscription. If the member making the call attempt has a higher priority level an alert signal is delivered to the lower priority current user of the traffic channel and within a preselected time period the connection of the current user is broken thereby enabling the higher priority member of the group to complete the call attempt.

The service node 101 includes the necessary logic for selectively providing a number of subscriber group special services to members of the subscription group. For example, a group call is enabled whereby a third party placing a call comprising all or selected members of the subscription group may be completed. In this mode, the subscriber number and preferably the name of the calling party is displayed on the mobile telephone station of each of the selected members of the group and, in response to one member of the group responding to the call, the name of the responding group member is displayed at the subscriber station of the other members of the group.

Another group functional feature includes providing the subscription group with a common access number and directing all calls to that number to the service node 101. The service node provides the calling party with a message asking them to identify the particular member of the subscription group with which it desires connection and in the event assistance is required, provides to the calling party a list of members of the group for selection by the calling party. The list of members of the group provided to the calling party may be restricted to only those members of the group which have informed the service node that they are ready to receive incoming calls. Service node 101 may also assemble a list of members of the group who are available to receive calls based upon those members who have recently completed either an outgoing or an incoming call and can therefore be assumed to be available to receive new calls. Of course, those members of the group who do not want to be disturbed can provide such an indication to the service node 101 and be excluded from the list of members available to receive calls and even prohibit call completion by the service node in response to selection of that member by the calling party.

The service node 101 may also include logic based upon time parameters associated with each member of the group which are used to restrict usage of the group subscription by group members. For example, the system may limit the accumulated time over a defined period during which selected individual members of the group may use the group subscription. Similarly, the system may limit the maximum length of time of individual connection by a member of the group or the accumulated costs during any individual connection.

Additionally, outgoing calls from a subscription group may be limited for individual group members to define only certain specific subscriber numbers which may be called by that member or certain specific members which are prohibited to that member, all as defined within the service node 101.

The service node 101 includes a function whereby in response to an incoming call or page directed to a member of the subscription group which has not answered, the call or page may be routed on in sequence to one or more successive alternative members of the group or may be routed simultaneous or groupwise to various members of the group.

Figure 3:
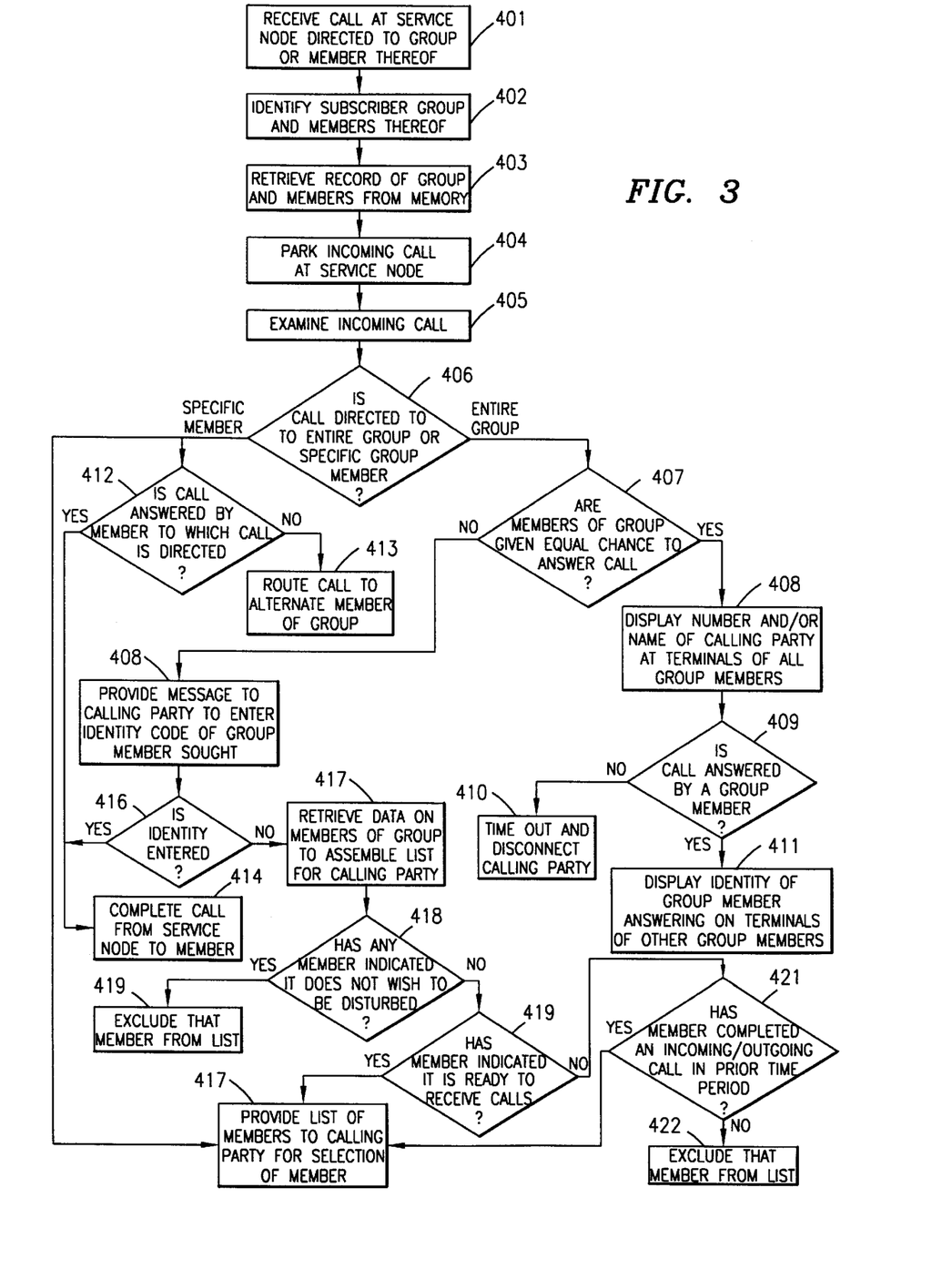
FIG. 3 is a flow chart illustrating certain aspects of the system and method of the present invention.

Referring to the flow diagrams of FIGS. 3 and 4, the operational functionality of the software and hardware contained within the service node 101 is illustrated and exemplary explanations of the manner in which outgoing calls from one or more members of the subscription group or incoming calls to either the group itself or members of the group may be handled.

Figure 2:
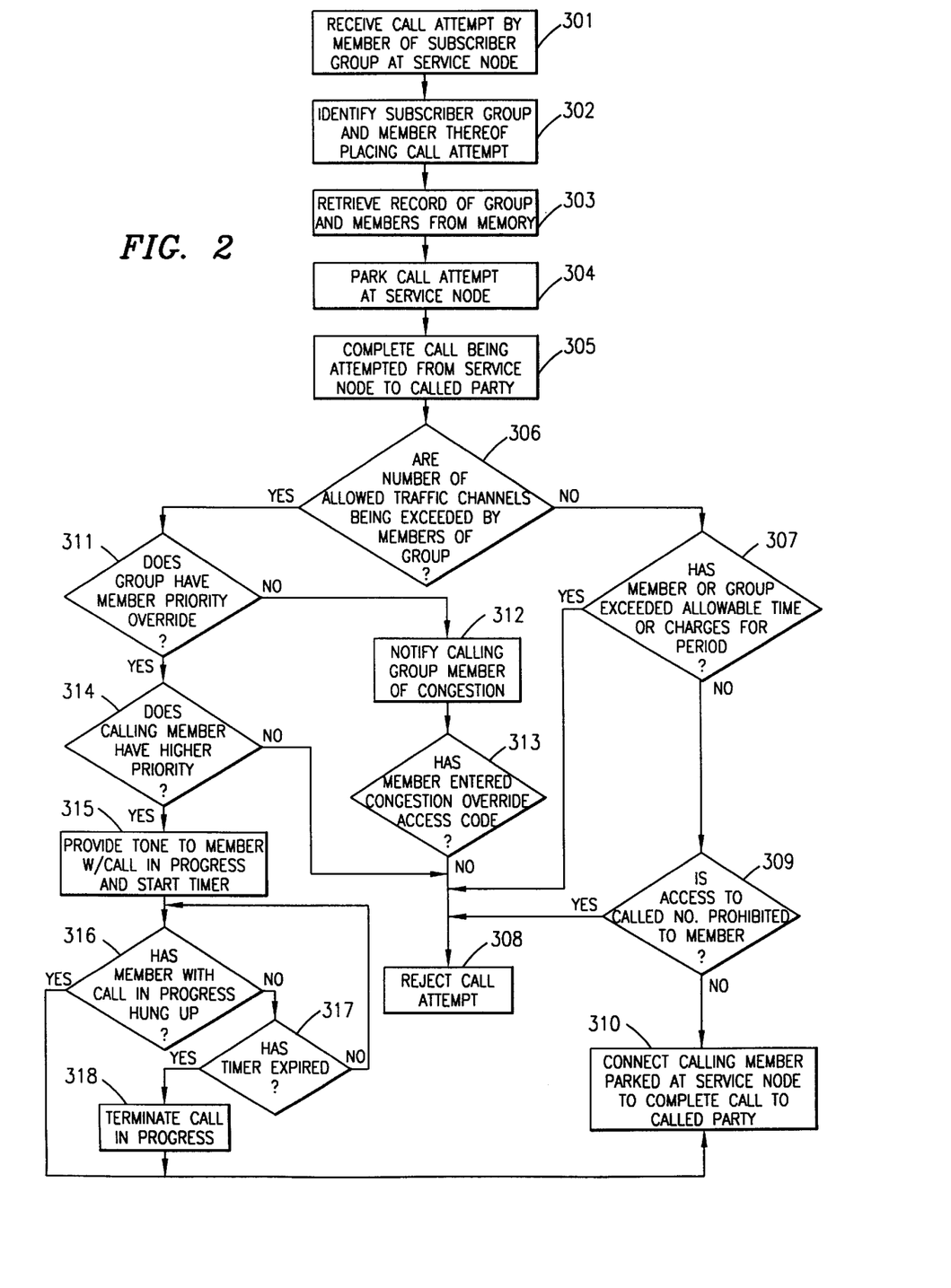
FIG. 2 is a flow chart illustrating certain aspects of the system and method of the present invention.

Referring first to FIG. 2, there is shown a flow chart depicting one aspect of the way in which the method and system of the present invention handles outgoing calls attempted by members of a subscriber service group. As pointed out above, a call attempt by a member of a subscriber group, which includes both the group and member identifications of the calling subscriber as well as the number of the called party, is received by the service node 101 at 301. The system identifies the subscriber group from which the call attempt is being made as well as the member thereof placing the call attempt at 302. At 303 the system retrieves the subscriber records of both the group itself as well as each of the members of the group from memory. The call attempt is then parked at the service node at 304 and the call which is being attempted is completed from the service node to the called party at 305.

At 306 the system evaluates from the subscriber records the number of allowed traffic channels which are assigned to the subscriber group within the system. This parameter may also be variable as a function of quality of service information within the system. For example, call set up time could be monitored and the subscriber group allowed a greater number of simultaneous traffic channels for the same charging rate during low traffic periods within the network than during peak hours. At 306 the system determines whether or not the call being attempted by a member of the subscriber group, together with the number of traffic channels currently being occupied by members of the same subscriber group, would exceed the allowed number of traffic channels to the group at that particular time. If the members of the group have not exceeded the number of allowed traffic channels, the system then moves to 307 and inquires whether or not the member of the group making the call attempt has exceeded its threshold of allowable air time or threshold or allowable charges attributable to that member for a preselected period of time, for example, a single billing period. At 307 the system also evaluates whether or not all the members of the group collectively have exceeded any threshold of either time or charges for the pre-selected period. If so, the system moves to 308 and rejects the call attempt by the member of the subscriber group and terminates the call set up from the service node to the called party. The group member placing the call attempt may be given notice of the call rejection by either a tone or a recorded message delivered to the subscriber station of the member. If, however, at 307 it has been determined that neither the member nor the group have exceeded the threshold of time or charges, the system moves to 309 where the system determines whether or not access to the called number being attempted by the member is prohibited to that member. For example, the system may deny access to toll facilities to certain members of a subscriber group. If, at 309, access is to be denied to the member making the call attempt, the system moves to 308 where the call attempt is rejected. If, at 309, access is not to be denied to the called number by the subscriber group member attempting the call, the system moves to 310 and the service node 101 completes the connection from the calling member parked at the service node to the completed call to the called party.

Returning to the decision point 306, in the event the call being attempted would increase the number of traffic channels in concurrent use by the members of the subscriber group to a number greater than that allowed to that group, the system moves to 311 and determines whether or not the subscriber group features include a member priority override feature. If they do not, the system moves to 312 at which the group member placing the call attempt is notified that congestion has occurred due go the fact that other members of the same subscriber group are currently occupying all of the traffic channels allowed to that group. If so, the system moves to 313 where it determines whether or not the group member placing the call attempt has entered a congestion override access code into the system indicating that the member desires to go ahead and complete the call attempt at a higher tariff than that normally charged to members of the group for their service period. If the member does not enter a congestion override access code the system moves to 308 and rejects the call attempt.

If, however, at 311, the group does have a member priority override feature in its subscription, the system moves to 314 and determines whether or not the calling member of the group has assigned to it a higher priority than one of the members of the group currently occupying traffic channels. If not, the system moves to 308 to reject the call attempt. If it does has such a higher priority, the system moves to 315 where a tone is provided to the group member currently occupying a traffic channel which has a lower priority than the member placing the call attempt. In addition, a timer is started following the notification tone, which timer can be set to a pre-selected time period giving the member an adequate time to conclude the call and release the traffic channel. At 316 the system evaluates whether or not the subscriber group member has hung up and released the traffic channel and, if so, moves to 310 to complete the call from the calling member parked at the service node to the completed call to the called party. If, at 316, the member occupying the traffic channel has still not hung up, the system moves to 317 and determines whether or not the timer has expired. If not, it continues to loop back through the queries at 316 and 317 until one of the two events occurs. If the timer has expired at 317, the system moves to 318 and terminates the call in progress by the group member occupying a traffic channel but which has a lower priority than the member making the call attempt. Finally, the call is completed at 310 from the member making the call attempt parked at the service node to the completed call placed to the called party.

It should be understood that the order and sequence of subscriber feature function execution depicted in flow chart of FIG. 2 is merely exemplary. Additional functions could be added and changed or modified depending upon the needs of the system operator and the nature of the service being offered to subscriber groups.

Referring next to FIG. 3, there is a flow chart which depicts one aspect of the manner in which a call received by the system and directed to either a subscriber group itself, to which a subscriber number is assigned, or to specific members of a subscriber group also identified by distinct and specific subscriber numbers. At 401 the system receives a call at the service node 101 which is directed to either the subscriber group or to a member of that group. At 402 the system identifies the subscriber group and its members to which the call is directed and moves to 403 where it retrieves the stored records of the group and each of its members from memory. At 404 the incoming call is parked at the service node and the details of the call are examined at 405.

At 406 the system determines whether the call is directed to the entire group itself or to a specific member of the subscriber group. If it is the entire group, the system moves to 407 where it inquires whether each of the members of the group are to be given an equal chance to answer the call or whether it is to be routed to specifically identified members of the group. If members are to be given equal opportunity the system moves to 408 where the telephone number and/or name of the calling party is displayed at each of the subscriber terminals of all of the members of the group. All of the members are also notified that an incoming call is present and any member of the group may feel free to answer that incoming call. At 409, the system determines whether or not the incoming call has been answered by a member of the group and if not, the system times out at 410 and the calling party is disconnected and given a message that no one is available to take that call. If at 409, the system determines that the call has been answered by one of the members of the group, the system moves to 411 to display the identity of the group member which has answered the call on each of the terminals of the other members of the group to notify them of the fact that someone within the group has taken the call and the identity of that member.

If, however, at 406, the system determines that the incoming call is directed to a specific member of the subscriber group, at 412 it determines whether or not the member to which the call is directed has answered the call. If not, the system moves to 413 where it routes the call to an alternate member of the group. Such a list of alternates may be selectively provided within the stored group profile within the service node. However, if it is determined at 412 that the call has been answered by the member of the group to which the call is directed, the system moves to 414 where the parked call is completed from the service node to the member to which it is directed.

Referring back to step 407 at which the system determines if members of the group are to be given equal chance to answer an incoming call directed to the entire group, and it is determined that the response of that query is negative, the system moves to 415 and a message is provided to the calling party requesting them to enter the identity code of the particular member of the group to which they would like to direct the call. At 416 the system determines if an individual identity of that member within the group has been entered and if so, moves to 414 where the call is completed from the service node to the member. If, however, at 416 no identity is entered, the system moves to 417 where it retrieves data on each of the members in the group and assembles a list of members for the calling party. In assembling a list of members to assist the calling party in selecting a particular member to direct the call, the system evaluates at 418 whether or not any of the members of the group have indicated it does not wish to be disturbed by incoming calls. If so, at 419 that member or those members are excluded from the list to be provided to the calling party. If not, the system moves to 419 where it evaluates whether or not a member has indicated it is ready to receive calls. This can be done by the member periodically calling the system and entering a code indicating that he or she is then ready to receive calls. If so, the system assembles a list of members of the group including those members which have indicated they are ready to receive calls and at 420 assembles a list of those members and provides that list by audible message to the calling party for its selection of a particular member within the group to which to direct the call. If, however, at 419 a member has not indicated he is ready to receive calls, the system moves to 421 where it evaluates whether or not that member has completed an incoming/outgoing call during a previously selected time period, for example, the same day. If that member has been placing outgoing calls or receiving calls during the pre-selected time period, the system moves to 420 and that member is added to the list to be provided to the calling party. If not, the system moves to 422 to exclude all members who have neither indicated readiness to receive calls nor placed an outgoing call or received an incoming call during the pre-selected time period from the list to be provided to the calling party from which it is to select a particular member to which to direct the incoming call.

The system functionality depicted in FIG. 3 is also exemplary in nature in that the order and specifics of the functions indicated may be modified and rearranged based upon the needs of a particular system operator and the subscriber services offered to a particular subscriber group membership.

As can be seen from the above description, the method and system of the present invention enables the provision of mobile radio telephone service which is especially advantageous to members of groups, such as families and small businesses. At the same time, the group subscription provided by the system of the present invention includes numerous advantages for a mobile radio system operator.

Although preferred embodiments of the method and apparatus of the present invention have been illustrated in the accompanying drawings and described in the foregoing description, it is understood that the invention is not limited to the embodiment(s) disclosed but it capable of numerous rearrangements, modifications and substitutions without departing from the spirit of the invention as set forth and defined in the following claims.

What is claimed is:

1. A method for providing telephone service within a radio telephone system to a group of radio telephone subscribers which has a group identity and each member of the subscriber group has a separate individual identity within the system, said method comprising:

receiving a call attempt by a member of the subscriber group at the system;

determining the identity of the subscriber group and the member thereof placing the call attempt;

retrieving from memory stored records of the subscriber group and the member making the call attempt;

parking the call attempt within the system;

completing a call from the system to the called party but not connecting that completed call to the parked call attempt;

determining within the system whether or not the completed call should be connected between the member making the call attempt and the called party by:

evaluating within the system a number of traffic channels currently in use by the members of the subscriber group;

comparing said number of traffic channels currently in use by the members of the subscriber group with a number of traffic channels allowed to the members of the group collectively, said number of traffic channels allowed to the members of the group collectively is a function of quality of service information including a flexible limit corresponding to current network traffic that is periodically compiled within a radio telephone system and cannot be affected by a subscriber; and connecting the parked call from the group member attempting the call to the completed call to the called party in response to the number of traffic channels currently in use being less than the number currently allowed to the group collectively; and either connecting the parked call attempt by the group member and the completed call from the system to the called party or terminating both the parked call and the completed call in response to said determining step.

2. A method for providing subscriber group telephone service in a radio telecommunication system as set forth in claim 1 including after said comparing step and before said connecting step the additional step of:

determining whether or not either the member placing the call attempt or the subscriber group collectively have exceeded a pre-selected value of traffic channel time allowed to that member or group during a pre-selected time period.

3. A method for providing subscriber group telephone service in a radio telecommunication system as set forth in claim 1 including after said comparing step and before said connecting step the additional step of:

determining whether or not the either member placing the call attempt or the subscriber group collectively have exceeded charging values greater than those allowed to the member or group during a pre-selected time period.

4. A method for providing subscriber group telephone service in a radio telecommunication system as set forth in claim 1 wherein completing the call includes after said comparing step and before said connecting step the additional step of:

determining whether the called number to which the parked call attempt is being made is prohibited to the member making the call attempt.

5. A method for providing group radio telephone service within a radio telephone system to the members of a subscriber group which have both a group identity and an individual identity for each of the members of the group and in which incoming calls are completed in accordance with the following steps:

receiving a call at the system directed to either the group or a specific member thereof;

identifying the subscriber group and members thereof;

retrieving from memory within the system the record of the subscriber group and its members;

parking the incoming call at the system;

determining whether the call is directed to the entire group or a specific member of that group and if the incoming call is determined not to be directed to the entire subscriber group, then said determining step includes:

determining that members of the group are not to be given equal chance to answer an incoming call directed to the entire group;

providing a message to the calling party to enter an identity code specifying the group member to which the call is to be specifically directed; and completing the call to the specific group member selected by the calling party in response to entry of that member's identity code; and completing the call to one of the members of the group following said determination.

6. A method for providing subscriber group telephone service in a radio telecommunication system as set forth in claim 5 including prior to said completing step in response to failure of the calling party to enter a member identity code, the additional step of:

retrieving data on the members of the group; and assembling a list of the available members of the group to be given to the calling party for selection.

7. A method for providing subscriber group telephone service in a radio telecommunication system as set forth in claim 6 wherein said step of assembling a list of members of the group to be given to the called party includes the additional steps of:

determining whether or not any member of the group to which the call is directed has indicated it wishes not to be disturbed and, in response thereto, excluding that member from the list;

determining whether or not a member has indicated that it is ready to receive calls and in response thereto including, that member on the list; and determining whether or not a member has received an incoming call or placed an outgoing call within a pre-selected time period and, in response thereto, including that member on the list to be given to the calling party.

8. A method for providing subscriber group telephone service in a radio telecommunication system as set forth in claim 5 wherein the incoming call is determined to be directed to a specific member of the group and includes prior to said completing step the additional steps of:

determining whether the call has been answered by the specific member to which it is directed; and either completing the call from the system to the member to which it is directed in response to said member answering the call or rerouting the call to an alternate member of the group in response to failure of the member to which the call is directed to answer.

9. A system for providing telephone service within a radio telephone system to a group of radio telephone subscribers which has a group identity and each member of the subscriber group has a separate individual identity within the system, said system comprising:

means for receiving a call attempt by a member of the subscriber group at the system;

means for determining the identity of the subscriber group and the member thereof placing the call attempt;

means for retrieving from memory stored records of the subscriber group and the member making the call attempt;

means for parking the call attempt within the system;

means for completing a call from the system to the called party but not connecting that completed call to the parked call attempt;

means for determining within the system whether or not the completed call should be connected between the member making the call attempt and the called party by:

means for evaluating within the system a number of traffic channels currently in use by the members of the subscriber group;

means for comparing said number of traffic channels currently in use by the members of the subscriber group with a number of traffic channels allowed to the members of the group collectively, said number of traffic channels allowed to the members of the group collectively is a function of quality of service information including a flexible limit corresponding to current network traffic that is periodically compiled within a radio telephone system and cannot be affected by a subscriber; and means for connecting the parked call from the group member attempting the call to the completed call to the called party in response to the number of traffic channels currently in use being less than the number currently allowed to the group collectively; and means for either connecting the parked call attempt by the group member and the completed call from the system to the called party or terminating both the parked call and the completed call in response to said determining step.

10. A system for providing subscriber group telephone service in a radio telecommunication system as set forth in claim 9 also including:

means for determining whether or not either the member placing the call attempt or the subscriber group collectively have exceeded a pre-selected value of traffic channel time allowed to that member or group during a pre-selected time period.

11. A system for providing subscriber group telephone service in a radio telecommunication system as set forth in claim 9 also including additional step of:

means for determining whether or not the either member placing the call attempt or the subscriber group collectively have exceeded charging values greater than those allowed to the member or group during a pre-selected time period.

12. A system for providing subscriber group telephone service in a radio telecommunication system as set forth in claim 9 which also include:

means for determining whether the called number to which the parked call attempt is being made is prohibited to the member making the call attempt.

13. A system for providing group radio telephone service within a radio telephone system to the members of a subscriber group which have both a group identity and an individual identity for each of the members of the group and in which incoming calls are completed by:

means for receiving a call at the system directed to either the group or a specific member thereof;

means for identifying the subscriber group and members thereof;

means for retrieving from memory within the system the record of the subscriber group and its members;

means for parking the incoming call at the system;

means for determining whether the call is directed to the entire group or a specific member of that group and if the incoming call is determined not to be directed to the entire subscriber group, then said means for determining further includes:

means for determining that members of the group are not to be given equal chance to answer an incoming call directed to the entire group;

means for providing a message to the calling party to enter an identity code specifying the group member to which the call is to be specifically directed; and means for completing the call to the specific group member selected by the calling party in response to entry of that member's identity code; and means for completing the call to one of the members of the group following said determination.

14. A system for providing subscriber group telephone service in a radio telecommunication system as set forth in claim 13 wherein the incoming call is determined to be directed to a specific member of the group and also includes:

means for determining whether the call has been answered by the specific member to which it is directed; and means for either completing the call from the system to the member to which it is directed in response to said member answering the call or rerouting the call to an alternate member of the group in response to failure of the member to which the call is directed to answer.

15. A system for providing subscriber group telephone service in a radio telecommunication system as set forth in claim 13 also including means responsive to failure of the calling party to enter a member identity code comprising:

means for retrieving data on the members of the group; and means for assembling a list of the available members of the group to be given to the calling party for selection.

16. A system for providing subscriber group telephone service in a radio telecommunication system as set forth in claim 15 wherein said means for assembling a list of members of the group to be given to the called party includes the additional steps of:

means for determining whether or not any member of the group to which the call is directed has indicated it wishes not to be disturbed and, in response thereto, excluding that member from the list;

means for determining whether or not a member has indicated that it is ready to receive calls and in response thereto including, that member on the list; and means for determining whether or not a member has received an incoming call or placed an outgoing call within a pre-selected time period and, in response thereto, including that member on the list to be given to the calling party.

17. A method for providing telephone service within a radio telephone system to a group of radio telephone subscribers which has a group identity and each member of the subscriber group has a separate individual identity within the system, said method comprising:

receiving a call attempt by a member of the subscriber group at the system;

determining the identity of the subscriber group and the member thereof placing the call attempt;

retrieving from memory stored records of the subscriber group and the member making the call attempt;

parking the call attempt within the system;

completing a call from the system to the called party but not connecting that completed call to the parked call attempt;

determining within the system whether or not the completed call should be connected between the member making the call attempt and the called party by:

evaluating within the system a number of traffic channels currently in use by the members of the subscriber group;

comparing said number of traffic channels currently in use by the members of the subscriber group with a number of traffic channels allowed to the members of the group collectively; and connecting the parked call from the group member attempting the call to the completed call to the called party in response to the number of traffic channels currently in use being less than the number currently allowed to the group collectively; and either connecting the parked call attempt by the group member and the completed call from the system to the called party or terminating both the parked call and the completed call in response to said determining step, wherein said service may include a feature which enables one member of the group to override a current connection to the system based upon a relative priority value assigned to each member of the group and wherein in response to a determination having been made that the members of the group are occupying the maximum number of traffic channels currently allowed to said group of:

determining whether or not the subscriber group services include said member priority override feature, and in response to a negative determination; and    notifying the calling group member of the existence of congestion within the network due to other members of its group occupying all of the available channels.

18. A method for providing subscriber group telephone service in a radio telecommunication system as set forth in claim 17 includes the additional step of:

connecting the parked call attempt to the completed call to the called party in response to the entry of a congestion override access code by the member attempting the call indicating its willingness to complete the call at a higher tariff than that normally given to the members of the subscriber group.

19. A method for providing subscriber group telephone service in a radio telecommunication system as set forth in claim 18 wherein in response to a determination that the subscriber group includes a member priority override feature, the additional steps of:

evaluating the priority ranking of the group members currently having a call in progress;

evaluating the priority ranking of the member placing the call attempt; and    completing the call in response to the member placing the call attempt having a higher priority than one of the other members of the group currently occupying a traffic channel.

20. A method for providing subscriber group telephone service in a radio telecommunication system as set forth in claim 19 wherein said step of completing the call of the member having a higher priority than a member with lower priority currently occupying a traffic channel includes the steps of:

providing an indication to the lower priority member with the call in progress on a traffic channel and starting a timer; and    completing the higher priority member's call in response to the lower priority member occupying the traffic channel either terminating its call or disconnection of the lower priority member responsive to the expiration of a pre-selected time period being reached by the timer.

21. A system for providing telephone service within a radio telephone system to a group of radio telephone subscribers which has a group identity and each member of the subscriber group has a separate individual identity within the system, said system comprising:

means for receiving a call attempt by a member of the subscriber group at the system;

means for determining the identity of the subscriber group and the member thereof placing the call attempt;

means for retrieving from memory stored records of the subscriber group and the member making the call attempt;

means for parking the call attempt within the system;

means for completing a call from the system to the called party but not connecting that completed call to the parked call attempt;

means for determining within the system whether or not the completed call should be connected between the member making the call attempt and the called party by:

means for evaluating within the system a number of traffic channels currently in use by the members of the subscriber group;

means for comparing said number of traffic channels currently in use by the members of the subscriber group with a number of traffic channels allowed to the members of the group collectively; and       means for connecting the parked call from the group member attempting the call to the completed call to the called party in response to the number of traffic channels currently in use being less than the number currently allowed to the group collectively; and    means for either connecting the parked call attempt by the group member and the completed call from the system to the called party or terminating both the parked call and the completed call in response to said determining step, wherein said service may include a feature which enables one member of the group to override a current connection to the system based upon a relative priority value assigned to each member of the group and wherein in response to a determination having been made that the members of the group are occupying the maximum number of traffic channels currently allowed to said group of:

means for determining whether or not the subscriber group services include said member priority override feature, and in response to a negative determination; and       means for notifying the calling group member of the existence of congestion within the network due to other members of its group occupying all of the available channels.

22. A system for providing subscriber group telephone service in a radio telecommunication system as set forth in claim 21 includes the additional step of:

means for connecting the parked call attempt to the completed call to the called party in response to the entry of a congestion override access code by the member attempting the call indicating its willingness to complete the call at a higher tariff than that normally given to the members of the subscriber group.

23. A system for providing subscriber group telephone service in a radio telecommunication system as set forth in claim 22 wherein responsive to a determination that the subscriber group includes a member priority override feature, the additional means of:

means for evaluating the priority ranking of the group members currently having a call in progress;

means for evaluating the priority ranking of the member placing the call attempt; and    means for completing the call in response to the member placing the call attempt having a higher priority than one of the other members of the group currently occupying a traffic channel.

24. A system for providing subscriber group telephone service in a radio telecommunication system as set forth in claim 23 wherein said means for completing the call of the member having a higher priority than a member with lower priority currently occupying a traffic channel includes:

means for providing an indication to the lower priority member with the call in progress on a traffic channel and starting a timer; and means for completing the higher priority member's call in response to the lower priority member occupying the traffic channel either terminating its call or disconnection of the lower priority member responsive to the expiration of a pre-selected time period being reached by the timer.

25. A method for providing mobile radio telephone group subscriptions comprising:

providing each member of a mobile radio telephone subscription group with a subscriber station having both a group subscription identity and a group member identity;

providing a group subscription service node accessible from both a radio telecommunications network and a fixed telephone network, said group subscription service node including logic for selectively controlling an incoming connection and a outgoing connection to each member of the subscription group operating within the radio telecommunications network;

receiving at said group subscription service node incoming and originating call attempts associated with the members of the subscription group; and selectively completing calls between third parties and members of the subscription group in accordance with a service profile comprising an individual profile associated with each member of the subscription group, a group service profile associated with the subscription group as a whole, and quality of service information including a flexible limit corresponding to current network traffic that is periodically compiled within a radio telephone system and cannot be affected by a subscriber.

26. A method for providing group radio telephone service within a radio telephone system to the members of a subscriber group which have both a group identity and an individual identity for each of the members of the group and in which incoming calls are completed in accordance with the following steps:

receiving a call at the system directed to either the group or a specific member thereof;

identifying the subscriber group and members thereof;

retrieving from memory within the system the record of the subscriber group and its members;

parking the incoming call at the system;

determining whether the call is directed to the entire group or a specific member of that group and if the incoming call is determined to be directed to the entire subscriber group, then said determining step includes:

determining whether members of the group are to be given an equal chance to answer the incoming call directed to the group;

displaying the number and/or name of the calling party at the subscriber terminals of all the members of the group;

determining whether the call has been answered by a member of the group; and either completing the call in response to one of the members answering the call and displaying the identity of the group member answering the call on the terminals of all the other group members; or timing out and disconnecting the calling party in response to none of the members answering the call; and completing the call to one of the members of the group following said determination.

27. A system for providing mobile radio telephone group subscriptions comprising:

means for providing each member of a mobile radio telephone subscription group with a subscriber station having both a group subscription identity and a group member identity;

means for providing a group subscription service node accessible from both a radio telecommunications network and a fixed telephone network, said group subscription service node including logic for selectively controlling an incoming connection and an outgoing connection to each member of the subscription group operating within the radio telecommunications network;

means for receiving at said group subscription service node incoming and originating call attempts associated with the members of the subscription group; and means for selectively completing calls between third parties and members of the subscription group in accordance with a service profile comprising an individual profile associated with each member of the subscription group, a group service profile associated with the group as a whole, and quality of service information including a flexible limit corresponding to current network traffic that is periodically compiled within a radio telephone system and cannot be affected by a subscriber.

28. A system for providing group radio telephone service within a radio telephone system to the members of a subscriber group which have both a group identity and an individual identity for each of the members of the group and in which incoming calls are completed by:

means for receiving a call at the system directed to either the group or a specific member thereof;

means for identifying the subscriber group and members thereof;

means for retrieving from memory within the system the record of the subscriber group and its members;

means for parking the incoming call at the system;

means for determining whether the call is directed to the entire group or a specific member of that group and if the incoming call is determined to be directed to the entire subscriber group, then said means for determining further includes:

means for determining whether members of the group are to be given an equal chance to answer the incoming call directed to the group;

means for displaying the number and/or name of the calling party at the subscriber terminals of all the members of the group;

means for determining whether the call has been answered by a member of the group; and means for either completing the call in response to one of the members answering the call and displaying the identity of the group member answering the call on the terminals of all the other group members; or means for timing out and disconnecting the calling party in response to none of the members answering the call; and means for completing the call to one of the members of the group following said determination.

29. A method for providing telephone service within a radio telephone system to a group of radio telephone subscribers which has a group identity and each member of the subscriber group has a separate individual identity within the system, said method comprising:

receiving a call attempt by a member of the subscriber group at the system;

determining the identity of the subscriber group and the member thereof placing the call attempt;

retrieving from memory stored records of the subscriber group and the member making the call attempt;

parking the call attempt within the system;

completing a call from the system to the called party but not connecting that completed call to the parked call attempt;

determining within the system whether or not the completed call should be connected between the member making the call attempt and the called party by:

evaluating within the system a number of traffic channels currently in use by the members of the subscriber group;

comparing said number of traffic channels currently in use by the members of the subscriber group with a number of traffic channels allowed to the members of the group collectively, said number of traffic channels allowed to the members of the group collectively is a function of quality of service information including call set up time that is periodically compiled within a radio telephone system and is used to determine the allowed number of traffic channels wherein more simultaneous traffic channels are allowed to the members of the group during low traffic period than during peak hours; and         connecting the parked call from the group member attempting the call to the completed call to the called party in response to the number of traffic channels currently in use being less than the number currently allowed to the group collectively; and     either connecting the parked call attempt by the group member and the completed call from the system to the called party or terminating both the parked call and the completed call in response to said determining step.

30. A system for providing telephone service within a radio telephone system to a group of radio telephone subscribers which has a group identity and each member of the subscriber group has a separate individual identity within the system, said system comprising:

means for receiving a call attempt by a member of the subscriber group at the system;

means for determining the identity of the subscriber group and the member thereof placing the call attempt;

means for retrieving from memory stored records of the subscriber group and the member making the call attempt;

means for parking the call attempt within the system;

means for completing a call from the system to the called party but not connecting that completed call to the parked call attempt;

means for determining within the system whether or not the completed call should be connected between the member making the call attempt and the called party by:

means for evaluating within the system a number of traffic channels currently in use by the members of the subscriber group;

means for comparing said number of traffic channels currently in use by the members of the subscriber group with a number of traffic channels allowed to the members of the group collectively, said number of traffic channels allowed to the members of the group collectively is a function of quality of service information including call set up time that is periodically compiled within a radio telephone system and is used to determine the allowed number of traffic channels wherein more simultaneous traffic channels are allowed to the members of the group during low traffic period than during peak hours; and         means for connecting the parked call from the group member attempting the call to the completed call to the called party in response to the number of traffic channels currently in use being less than the number currently allowed to the group collectively; and     means for either connecting the parked call attempt by the group member and the completed call from the system to the called party or terminating both the parked call and the completed call in response to said determining step.

* * * * *